April 26, 1932. W. F. SCHACHT 1,855,315
CASTER ROLLER
Filed Nov. 2, 1931
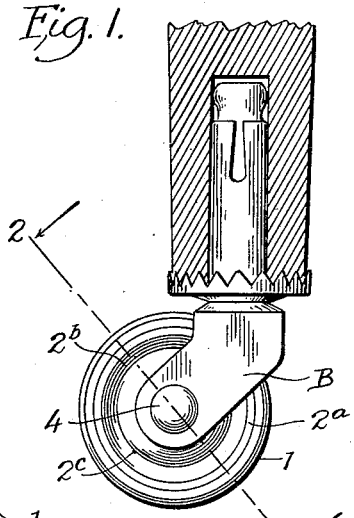
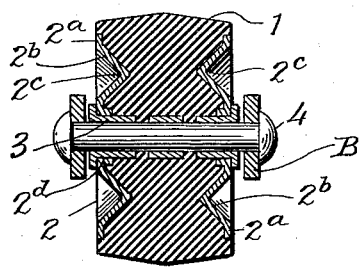
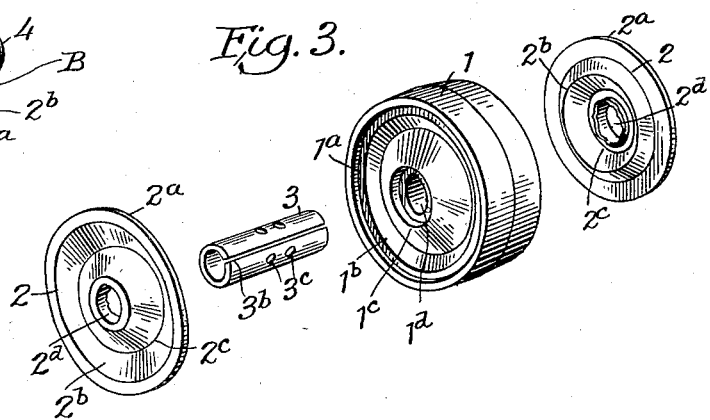
Inventor
William F. Schacht
By Alexander D. Sowell
Attorneys Patented Apr. 26, 1932

1,855,315

UNITED STATES PATENT OFFICE

WILLIAM F. SCHACHT, OF HUNTINGTON, INDIANA

CASTER ROLLER

Application filed November 2, 1931. Serial No. 572,680.

This invention is a novel improvement in caster wheels particularly adapted for articles of furniture, and the object of the invention is to provide a caster wheel of solid rubber with means for preventing lateral distortion of the rubber body under load.

I will explain the invention with reference to the accompanying drawings which illustrate a caster wheel constructed in accordance therewith, and summarize in the claims the novel features of construction, and novel combinations of parts, for which protection is desired.

In said drawings:—

Fig. 1 is a view partly in section of a caster applied to the leg of an article of furniture, and equipped with my novel wheel.

Fig. 2 is an enlarged transverse section on the line 2—2, Fig. 1.

Fig. 3 is a sectional view of the parts of the wheel detached.

The wheel holding portion of the caster may be of any desired type, an ordinary form being shown comprising a shank to be engaged with a socket in the leg or part of the object to which the caster is to be applied, as indicated in Fig. 1; and having at its lower end a bifurcated member B to embrace the caster wheel and carrying the axle or stub shaft on which the wheel is journaled.

The novel caster wheel consists of a resilient molded all-rubber body portion 1 of circular contour and substantial width. In each side face of the body 1 near its periphery is a shallow annular recess 1a; within the recess 1a is an annular recess 1b of smaller diameter, the sides of said recess being flared or tapered as shown; within the recess 1b and co-axial therewith is an outwardly projecting conical boss 1c; and extending through the wheel and bosses 1c is an axial bore 1d.

Fitted within the recess 1a, in each side face of the body 1, is a side-plate 2 which in diametrical cross-section conforms in contour to a diametrical cross-section of the face or side of the body 1 against which it is fitted. Each plate has a peripheral flange 2a adapted to fit in the recess 1a, an annular V-shaped portion 2b adapted to fit in the groove 1b, and an inner concavo-convex portion 2c adapted to fit over the projection 1c on the face of the body; and the plate has a central opening 2d adapted to register with the bore 1d in the body. These side plates are preferably made of sheet metal stamped to conform in area and contour on their inner faces with the recessed face of the body 1.

A metallic bushing 3 is closely fitted within the axial bore 1d of the body 1, and the ends of the bushing project through the openings 2d in the side plates 2 and are flanged over the adjacent edges of said openings as shown in Fig. 2.

In assembling the wheel the bushing is inserted in the bore, the plates slipped over the ends of the bushing and fitted in the recesses of the body; then the plates are pressed tightly against the body so as to compress the rubber therebetween, and the ends of the bushing flanged over the plates so as to lock them securely together. As thus applied the plates 2 clamp the rubber body securely between them and substantially reinforce the body, and prevent lateral deflection or distortion of the body between the plates; and there being no spaces in which the body might expand between the plates consequently when pressure is applied to the periphery of the body it only tends to compress the central portion thereof between the plates and does not loosen it on the core.

The conical portions of the body help to reinforce the plates, and the angular portion of the plates, in cross-section, make them very rigid, substantial and strong. The outer parts 2a of the plates fitting in the recesses 1a help to support the periphery of the body under vetrical pressure, and the inclined portion of the outer wall of the recess 2b of the plate also reinforces the peripheral or tread portion of the body of the wheel.

After the wheel is assembled and connected as described it can be entered between the bifurcations of the support B and may be secured therebetween by means of a pin or bolt 4 of any suitable construction; whereby the wheel is rotatably mounted upon and connected with the shank and forms therewith a complete caster.

The bushing 3 is preferably made from a flat piece of metal rolled into cylindrical shape leaving an open slot 3b between the adjacent edges of the rolled plate. If desired the bushing might be perforated as at 3c. Such a bushing is particularly useful during the molding operation as the body is molded around the bushing the rubber will enter and fill the slot and/or perforations and thus lock the bushing to the wheel; and such bushing so attached will cause the roller to rotate substantially noiselessly upon the pin 4.

I claim:

1. A caster wheel, comprising a molded circular solid rubber body having an annular recess in each side adjacent its periphery, a second smaller annular concave recess within the first recess, a conical axial projection within the second recess, and an axial bore extending through the conical projections; side plates having their inner faces corresponding in diametrical cross-sectional contour with the contour of diametrical cross-sections of the sides of the body, and closely fitted thereagainst; and means transfixing the body and connecting the side plates.

2. In a caster wheel as set forth in claim 1, said connecting means comprising a longitudinally slotted tubular bushing enclosed in the body, and the material of the body filling the slot in the bushing, thereby locking the bushing in the body.

3. In a caster wheel as set forth in claim 1, said connecting means comprising a hollow tubular bushing molded in the body and connecting the side plates, said bushing having perforations filled with integral portions of the body to lock the bushing thereto.

4. A caster wheel, comprising a cylindrical molded rubber body having in each side face an annular stepped recess, a second concave recess within the first, and a conical projection within the concave recess; side plates fitted against opposite faces of the body, each having an outer portion corresponding in cross-section with the outer annular recess, an inner concavo-convex annular portion corresponding in cross-section with the second recess, and a hollow conical projection fitting the conical projection of the body; and means transfixing the body and connecting the side plates together.

5. In a caster wheel as set forth in claim 4, said connecting means comprising a longitudinally slotted tubular bushing enclosed in the body, and the material of the body filling the slot in the bushing, thereby locking the bushing in the body.

6. In a caster wheel as set forth in claim 4, said connecting means comprising a hollow tubular bushing molded in the body and connecting the side plates, said bushing having perforations filled with integral portions of the body to lock the bushing thereto.

WILLIAM F. SCHACHT.